United States Patent [19]

Braune et al.

[11] 4,414,570
[45] Nov. 8, 1983

[54] CIRCUIT ARRANGEMENT FOR EXTRACTING A FIELD SYNCHRONIZING SIGNAL FROM A TELEVISION SYNCHRONIZING SIGNAL

[75] Inventors: Dirk Braune, Ahrensburg; Wolfgang Schwartz, Hamburg, both of Fed. Rep. of Germany

[73] Assignee: U.S. Philips Corporation, New York, N.Y.

[21] Appl. No.: 309,334

[22] Filed: Oct. 7, 1981

[30] Foreign Application Priority Data

Oct. 8, 1980 [DE] Fed. Rep. of Germany ....... 3037987

[51] Int. Cl.³ .............................................. H04N 5/04
[52] U.S. Cl. .................................................. 358/154
[58] Field of Search ................ 358/150, 153, 154, 155

[56] References Cited

U.S. PATENT DOCUMENTS

| | | | |
|---|---|---|---|
| 3,671,669 | 6/1972 | Abbott | 358/154 |
| 3,878,335 | 4/1975 | Balaban | 358/150 |
| 4,110,789 | 8/1978 | Maly | 358/154 |
| 4,319,275 | 3/1982 | Tanaka | 358/154 |
| 4,334,243 | 6/1982 | Srivastava | 358/153 |
| 4,353,091 | 10/1982 | Hoppe | 358/153 |

FOREIGN PATENT DOCUMENTS 1299420 12/1972 United Kingdom .

*Primary Examiner*—Michael A. Masinick
*Attorney, Agent, or Firm*—Thomas A. Briody; William J. Streeter; Edward W. Goodman

[57] ABSTRACT

A circuit arrangement for extracting a field synchronizing signal from a television signal comprising binary switching stages. Herein, the duration of a broad field synchronizing pulse is determined because the peak value thereof is sampled with a clock signal, the period of the clock signal being significantly shorter than the duration of a line synchronizing pulse. For this purpose the frequency thereof may be the color sub-carrier frequency or a multiple thereof.

8 Claims, 2 Drawing Figures

CIRCUIT ARRANGEMENT FOR EXTRACTING A FIELD SYNCHRONIZING SIGNAL FROM A TELEVISION SYNCHRONIZING SIGNAL

The invention relates to a circuit arrangement for extracting a field synchronizing signal from a television synchronizing signal, which comprises at least line and field synchronizing pulses the amplitude of which extends between a black and a peak level, the circuit arrangement comprising binary, clock pulse-controlled switching stages.

BACKGROUND OF THE INVENTION

In prior art circuits of this type, for example as disclosed in the German Patent Application No. 29 47 881 delays of pulse edges or pulses are produced by means of, for example, monostable multi-vibrator circuits and the amplitude of the composite pulse to be tested is measured at two different moments. Thus it is determined whether the amplitude value at the two moments is higher or not higher compared with a limit value; from this it is determined whether a long pulse is present. As measurements are performed at only two different moments it is not impossible that two separate, shorter pulses occurring at these two moments are regarded as a long pulse.

The invention has for its object to enable an accurate measurement by means of the circuit arrangement of the real duration of the pulses to exclude the possibility of errors, so that a reliable field synchronizing signal is obtained. In addition, the circuit arrangement must be suitable for implementation as an integrated semiconductor circuit.

BRIEF SUMMARY OF THE INVENTION

According to the invention, the circuit arrangement is characterized in that means are provided to apply the television synchronizing signal to a detector which is periodically made operative by a clock signal for producing a first test signal when the television synchronizing signal substantially reaches the peak level, the first test signal starting a time measuring element which produces a switching signal when it reaches a preset value before it is reset, and for producing a second test signal when the black level is substantially reached, this second test signal resetting the time measuring element when the preset value has not yet been reached by it, the period of the clock signal being significantly shorter than the duration of a line synchronizing pulse.

With the circuit arrangement in accordance with the invention a distinction can be made with certainty between the line and field synchronizing pulses. For that purpose the circuit arrangement in accordance with the invention may advantageously be characterized in that the frequency of the clock signal is the colour sub-carrier frequency or a multiple thereof.

It should be noted that U.S. Pat. No. 3,878,335 describes a circuit arrangement in which the duration of a pulse is measured. What is concerned here is, however, a duration which is approximately equal to the duration of the entire field synchronizing signal, i.e. 6 line periods in accordance with the U.S. standard. For that purpose the incoming television synchronizing signal is first integrated, which is effected with analogue and discrete elements, while the leading edge of the pulse to be measured is not known with certainty, particularly not in the presence of disturbances.

BRIEF DESCRIPTION OF THE DRAWINGS

The invention will now be described in greater detail by way of non-limitative example with reference to the accompanying drawing, in which.

DETAILED DESCRIPTION OF THE PREFERRED EMBODIMENT

Figure 1:
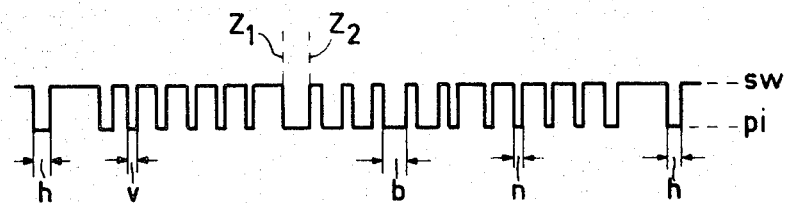
FIG. 1 shows the picture frequency pulse diagram of a television standard.

FIG. 1 shows at the end of a field a negative going composite synchronizing signal in accordance with the European television standard. Here the several pulses have a different duration and they extend between the level sw corresponding with black and the lower pulse peak level pi. The normal line synchronizing pulses h which occur between the individual picture lines and have a duration of 4.7 μs are followed by five pre-equalizing pulses v each having a duration of 2.35 μs, which are immediately followed by five field synchronizing pulses b each having a duration of approximately 27 μs. Then there follow post-equalizing pulses n each having a duration of 2.35 μs, until finally the normal line synchronizing pulses h start. It must now be determined when the first pulse of the pulses b occurs at the pulse peak level pi.

Figure 2:
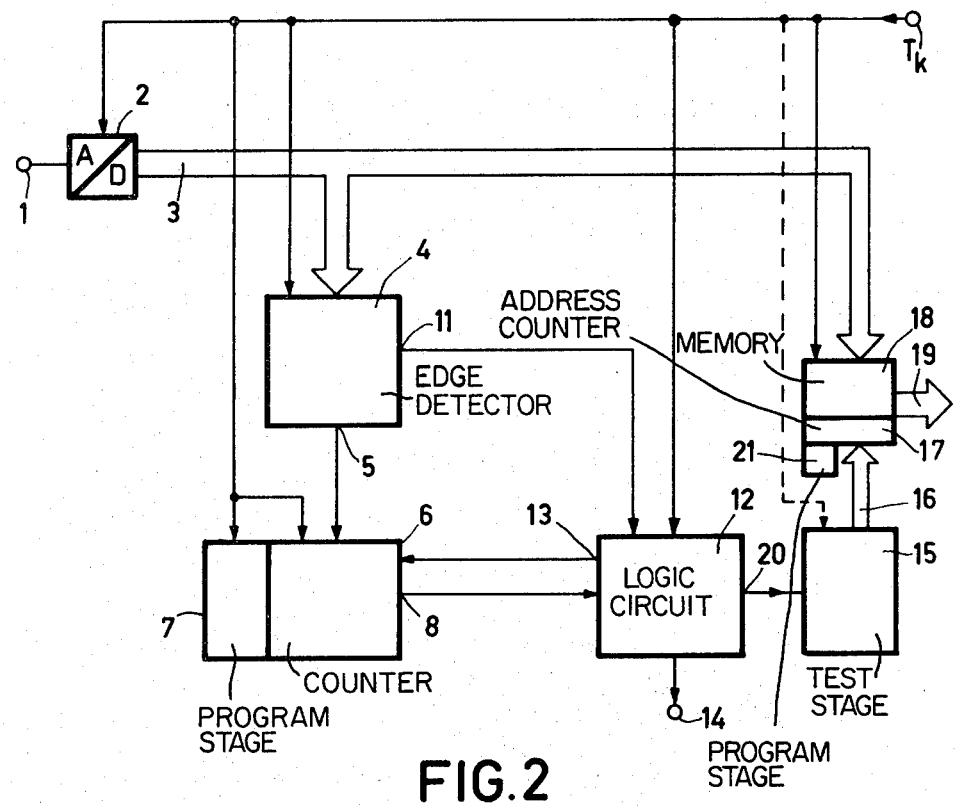
FIG. 2 shows the overall circuit arrangement of stages for the pulse processing in accordance with the invention.

In the block schematic circuit diagram shown in FIG. 2 the video signal from which the video signal portions may optionally be removed by means of a synchronizing separation stage, in which case this signal contains only the synchronizing pulses, is applied from a terminal 1 to an analogue-to-digital converter 2. On a line 3 connected to the output thereof the synchronizing pulses are present in digital form. They are applied to an edge detector 4 to which the same clock signals $T_k$ as were applied to the converter 2 are applied, these clock signals $T_k$ being produced by a clock signal source, not shown. As a good resolution is the aim for the conversion of the video signals the clock signal $T_k$ has a high frequency, namely the colour sub-carrier frequency $F_o$ of 4.43 MHz, or, in the present example, 17.72 MHz, which corresponds to four times the colour sub-carrier frequency.

If the composite synchronizing signal transferred to the line 3 reaches an amplitude value which is located between the levels sw and pi, that is to say if a negative edge occurs, this is detected by means of detector 4 and a time measuring element is started by a first test signal occurring at an output 5 of the detector. This element may be in the form of a counter 6 to which the clock pulses $T_k$ are applied and which is adjusted so by a program stage 7 that a signal is produced at the output 8 of element 6 if said element has counted a predetermined number of clock periods after the start. In other words, program stage 7 serves as a presetting device for counter 6 by means of which counter 6 is adjusted to count a predetermined number of clock pulses. In the present case the signal must occur at the output 8 is the counter 6 has been in operation for a longer period of time than corresponding to the duration of a normal line synchronizing pulse h, i.e. approximately 5 μs; for that purpose the counter 6 may be preset to 7 μs, or 124 periods of the clock frequency of 17.72 MHz.

If, for example, the negative edge occurs prior to a pre-equalizing pulse v the counter 6 is started. As, however, the next positive edge occurs already after a duration of 2.35 μs, an output 11 of detector 4 applies a second test signal as a criterium to a circuit with S/R-logic 12, which thereafter produces at an output 13 a signal which resets the counter 6 to its starting value. Counter 6 is started again at the next negatively-going edge and is reset at the following positive edge, until finally an edge occurs at an instant designated $Z_1$ in FIG. 1. As this edge is followed by a level value whose duration of approximately 27 μs is essentially larger than the value of 7 μs preset by means of counter 6, counter 6 is not reset before the end of its operation. So via its output 8 it supplies after 7 μs a signal to the circuit 12, which implies that detector 4 is now at the peak value of the first broad field synchronizing pulse after instant $Z_1$. Circuit 12 which is also supplied with clock signal $T_k$ then produces as its output 14 immediately or after a predetermined delay a signal which represents the field change in the television signal.

Preferably the circuit 12 is arranged so that it produces an output pulse if detector 4, after recognition of the broad field synchronizing pulse at the instant $Z_2$ at which the next positive-going edge occurs produces a signal at its output 11. Counter 6 stops after it has counted the preset period so that it does not disturb the further signal formation. It can be reset to its initial position after a predetermined delay period for the next desired recognition; this may, for example, be performed at the end of a portion of a field if the field change has been performed by means of a counter, not shown, which counts a number of lines, for example 100 lines, corresponding with the said delay time.

In FIG. 2 there is connected to an output 20 of circuit 12 a test stage 15, an output 16 of which is connected to an address counter 17. Output 20 always produces a resetting and starting pulse if a positive edge occurs in the signal shown in FIG. 1 and a corresponding criterium, for example a pulse edge, is applied as a second test signal from the output 11 of detector 4 to circuit 12. This is, for example, the case on the trailing edge of every equalizing pulse. The output 20 does not respond to the next negative edge which releases the first test signal: address counter 15 continues counting. So if after the next negative edge no pulse b follows, so if a positive edge (second test signal) occurs before counter 6 has stopped counting, not only counter 6 but also address counter 17 are reset and the latter starts counting again at the next positive-going edge.

If, however, the first pulse b is reached and counter 6 continues counting until its preset value has been reached, address counter 17 is not reset by the output signal of terminal 20 and by output 16 until the next first test signal, but address counter 17 continues counting until its preset final value. This final value may be reached after 1135 clock periods, which are determined by a program stage 21 so after a line duration of approximately 64 μs. Program stage 21 functions similarly to program stage 7 in that it serves as a presetting device for address counter 17 by means of which address counter 17 is adjusted to count a predetermined number of clock pulses. Output 16 may control a memory 18 to which not only clock signals $T_k$ but also the input signal in digital form 3 is applied, the video signals not having been removed from said input signal. Under the control of address counter 17, picture signals of the two levels which have each a duration of approximately 27 μs may then be stored in memory 18 prior to and after instant $Z_1$. From this it can be determined whether distortions occur and, if so, which distortion shows a unity jump at 17, from which, by evaluating the stored signals, corrections may be performed in known manner by means of switching elements which are controlled by an output 19 of memory 17, for example the suppression of echo signals by adding delayed signals.

The invention enables the accurate determination of a broad pulse level in a pulse train. As by means of detector 4 it is tested in every clock period if after a negative edge the negatively directed threshold value is still exceeded, so if the negative pulse level is still present, or if a positively going edge has already occurred, the duration of the pulse is always tested again by means of the number of clock periods and the continuity of the pulse determined.

In order to ensure that any disturbing pulses which may occur in the positive direction cannot exercise any influence during the broad field synchronizing level a smoothing operation may be performed either in the analogue or in the digital signal. The smoothing operation in the digital signal is performed by for example, forming the average value of a number of adjacent digital values, so that brief interruptions cannot exercise any influence.

What is claimed is:

1. A circuit arrangement having binary clock pulse controlled stages for extracting a field synchronizing signal from a television synchronizing signal having at least line and field synchronizing pulses the amplitude of which extends between a black level and a peak level, said circuit arrangement comprising:
   a source of said binary clock pulses,
   means connected to said source of clock pulses for providing said television synchronizing signal,
   a detector connected to said source of clock pulses, and
   a time measuring element connected to said source of clock pulses, said means for providing said television synchronizing signal connected to said detector for applying said television synchronizing signal thereto, said detector being periodically made operative by a clock signal from said source of clock pulses for producing a first test signal when said television synchronizing signal substantially reaches said peak level, said first test signal starting said time measuring element which produces a switching signal when said time measuring element reaches a preset value before it is reset, said detector producing a second test signal when said black level is substantially reached, said second test signal resetting said time measuring element when the preset value has not yet been reached by said time measuring element, the period of said clock signal being significantly shorter than the duration of a line synchronizing pulse.

2. A circuit arrangement as claimed in claim 1, comprising means for producing an output switching signal after the occurrence of said second test signal.

3. A circuit arrangement as claimed in claim 1 comprising a testing stage and a counter and wherein at the occurrence of said second test signal said testing stage starts said counter which is reset to its initial position only when said time measuring element has not reached said preset value at the time said black level is substantially reached.

4. A circuit arrangement as claimed in claim 2 comprising a testing stage and a counter, and wherein said means for producing said output switching signal comprises a logic circuit and wherein at the occurrence of said second test signal said testing stage starts said counter which is reset to its initial position only when said time measuring element has not reached said preset value at the time said black level is substantially reached.

5. A circuit arrangement as claimed in claim 4, wherein said counter is reset when said first test signal occurs before said counter has reached a position which corresponds to a significant portion of the interval after the last preceding equalizing pulse, and wherein said testing stage produces an output signal when said time measuring element has reached its preset value while said counter has not yet reached it preset value.

6. A circuit arrangement as claimed in claim 1, wherein the frequency of said clock signal is the same as the color sub-carrier frequency or a multiple thereof.

7. A circuit arrangement as claimed in claim 6, comprising an analogue-to-digital converter and wherein said television synchronizing signal is applied to said detector through said analogue-to-digital converter, said analogue-to-digital converter being supplied with said clock signal, the frequency of said clock signal being four times said color carrier frequency.

8. A circuit arrangement as claimed in claim 7 comprising first and second program stages, said first program stage adjusting said time measuring means and said second program stage adjusting said counter.

* * * * *